No. 677,178. Patented June 25, 1901.
A. B. COREY.
WHEELED SCRAPER.
(Application filed Mar. 18, 1901.)
(No Model.) 2 Sheets—Sheet 1.
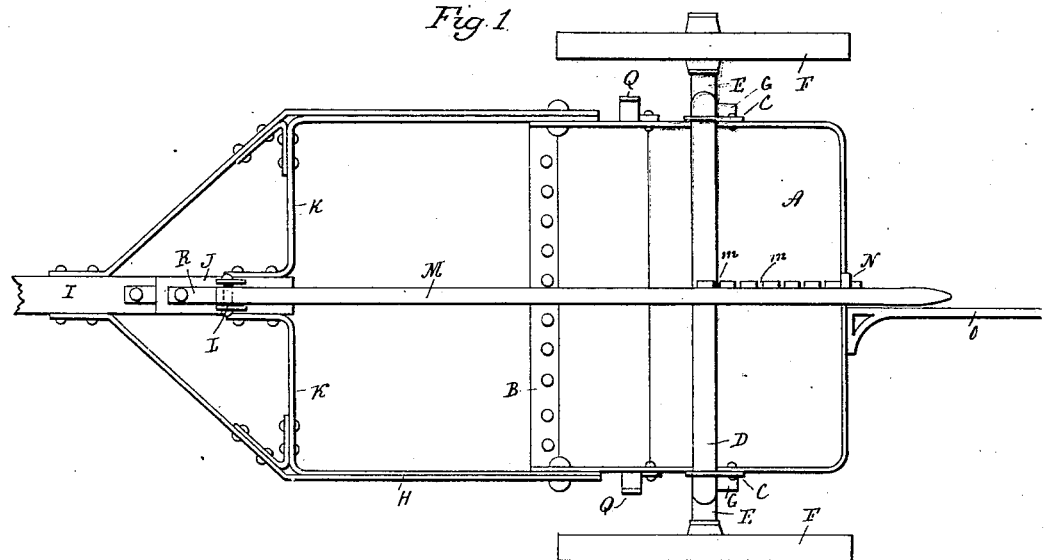
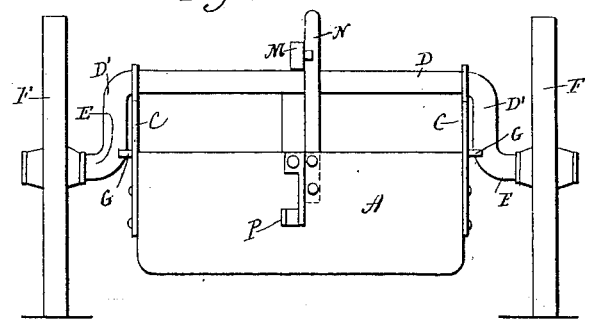
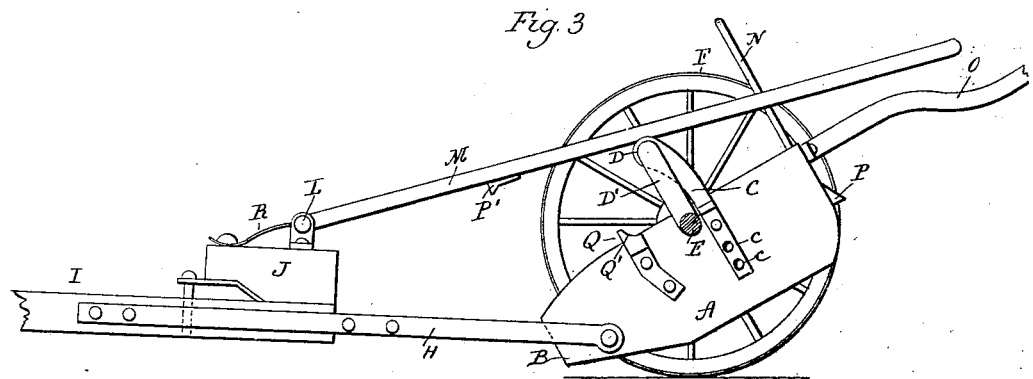
Witnesses
J. H. Shumway
Lillian D. Kelsey
Amos B. Corey
Inventor
By attys Seymour & Earle
THE NORRIS PETERS CO., PHOTO-LITHO., WASHINGTON, D. C.

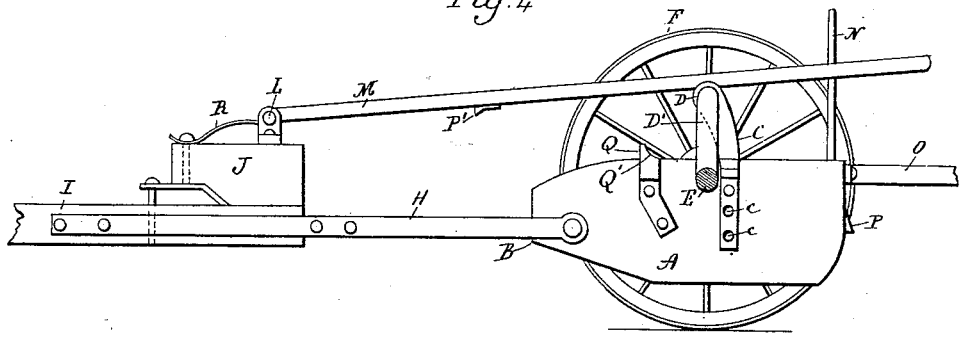
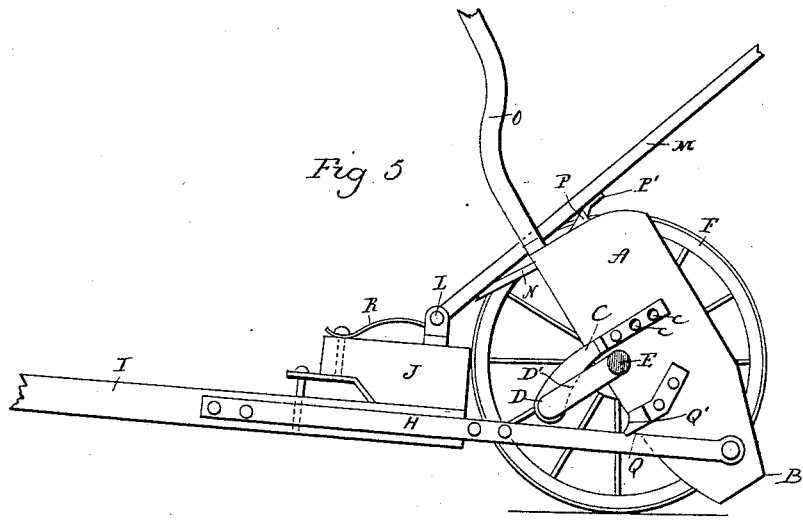
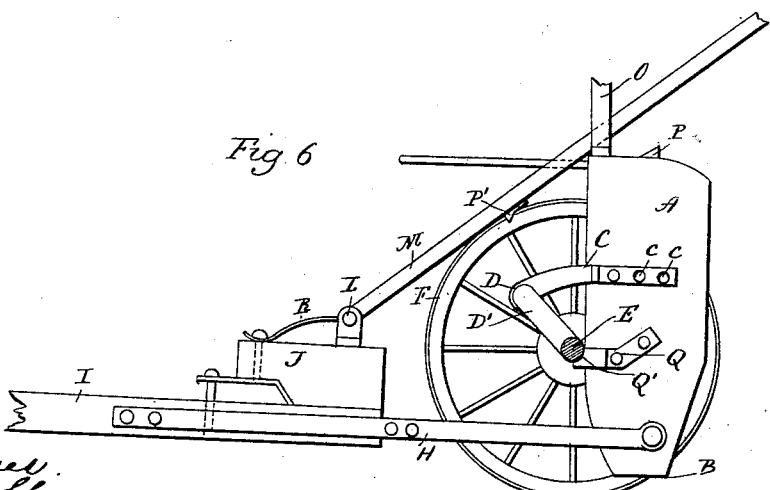

UNITED STATES PATENT OFFICE.

AMOS B. COREY, OF OGDEN, UTAH.

WHEELED SCRAPER.

SPECIFICATION forming part of Letters Patent No. 677,178, dated June 25, 1901.

Application filed March 18, 1901. Serial No. 51,700. (No model.)

*To all whom it may concern:*

Be it known that I, AMOS B. COREY, of Ogden, in the county of Weber and State of Utah, have invented a new Improvement in Wheeled Scrapers; and I do hereby declare the following, when taken in connection with the accompanying drawings, and the letters of reference marked thereon, to be a full, clear, and exact description of the same, and which said drawings constitute part of this specification, and represent, in—

Figure 1, a top or plan view of a scraper constructed in accordance with my invention; Fig. 2, a rear elevation of the same; Fig. 3, a side view with the pan in position for digging; Fig. 4, a similar view with the pan in the horizontal or carrying position; Fig. 5, a similar view with the pan in the vertical or dumping position; Fig. 6, a similar view with the pan in the position when fully dumped.

This invention relates to an improvement in wheeled scrapers, the object being to produce a scraper which may be readily operated and by which the pan may be locked in various positions either for digging, carrying, or dumping; and it consists in the construction as will be hereinafter described, and particularly recited in the claims.

The pan A, which is of substantially usual form, having a cutting-blade B at its forward edge, is suspended, by means of the hangers C, secured to the opposite sides of the pan, to an axle D, the outer ends E of which and to which the wheels F are secured are offset. Preferably the hangers will be provided with two or more holes c, by which the hangers may be adjusted with relation to the pan. The hangers are also provided with lugs G, which bear upon the downturned portions D' of the axle, as will more fully hereinafter appear. Secured to the opposite sides of the pan A, near the forward end, is a bail H, the forward end of which is secured to the usual tongue I, the said tongue extending rearward beneath a block J, which is held in position by braces K, extending into connection with the bail. Pivoted in trunnions L, mounted on the block J, is a lock-shaft M, which extends rearward over the axle D and beyond the rear edge of the pan A and on one side is formed with a series of notches $m$, adapted to engage with a key N, secured to the rear wall of the pan. Also secured to the rear wall of the pan is a dumping-lever O and a triangular catch P, which is adapted to coact with a corresponding projection P', formed on or secured to the under side of the lock-shaft M. Secured to opposite sides of the pan, forward of the hangers C, are trunnions Q, formed in their upper ends with recesses Q' to receive the axle, as will hereinafter appear. Preferably I will arrange a spring R on the block J, the free end of the spring extending beneath the end of the lock-shaft M and so as to prevent its being thrown forward when the pan is dumped.

When the scraper is ready for digging, in the position shown in Fig. 3, the dumping-lever I is raised to give the pan the proper pitch and the key J engaged with one of the notches $m$ in the lock-shaft M, which holds the pan in proper position, and in this position the lugs G bear upon the turned-down portions D' of the axle, as shown in Figs. 1, 2, and 3, and the hangers C may be adjusted with relation to the pan to give the pan the proper pitch. After the scraper is filled the key N is disengaged from the notches $m$ on the lock-shaft and the dumping-lever O depressed, whereby the pan is thrown into a horizontal position, as shown in Fig. 4, in which position another notch on the lock-shaft is engaged with the key. In this position also the axle is prevented from turning by the engagement of the lug G therewith. When ready to dump, the lock-shaft is disengaged from the key N and the dumping-lever raised, so as to throw the pan into a vertical position, as shown in Fig. 6, in which position the axle drops into the notch Q' of the trunnion Q, and so supports the pan in this position, the spring R acting to prevent the lock-shaft from being thrown forward. On the completion of the dumping the triangular catch P engages with the projection P' on the lock-shaft and locks the pan in its fully-dumped position, as shown in Fig. 5. In this case the trunnion Q will have moved away from the axle, which then rests upon the bail G. To return the pan to its normal position, the lock-shaft is slightly raised to disengage the catch P, which permits the dumping-lever to be drawn rearward and the pan into its digging or carrying position.

While the hangers may be adjusted with relation to the pan to change the position of the pan, they are also useful in adjusting the pan with relation to the axle when larger or smaller wheels are employed. With a scraper thus constructed less power is required by the operator and team, as every part of the load is supported by the wheels, and there is no dragging while loading, and when loaded the pan is in a position to properly carry the load.

Having fully described my invention, what I claim as new, and desire to secure by Letters Patent, is—

1. In a wheeled scraper, the combination with a pan suspended from an axle having downwardly-offset ends on which wheels are secured, a bail secured to the forward end of said pan, and extending forward into connection with a tongue, a lock-shaft mounted forward of the pan and extending over the axle, and beyond the rear edge of the pan, and a key secured to said pan and adapted to engage with notches formed on the said lock-shaft, substantially as described.

2. In a wheeled scraper, the combination with a pan provided on opposite sides with hangers by which the pan is suspended from an axle having downwardly-offset ends on which wheels are mounted, lugs on opposite sides of the pan and adapted to bear upon the downturned ends of the axle, a bail secured to the forward end of the pan and extending forward into engagement with a tongue, a lock-shaft pivotally mounted forward of the pan and extending rearward over the axle and beyond the rear of the pan, and a key secured to the rear of the pan and adapted to engage with notches on the lock-shaft, substantially as described.

3. In a wheeled scraper, the combination with a pan provided on opposite sides with hangers by which the pan is suspended from an axle having downwardly-offset ends on which wheels are mounted, lugs on opposite sides of the pan and adapted to bear upon the downturned ends of the axle, a bail secured to the forward end of the pan and extending forward into engagement with a tongue, a lock-shaft pivotally mounted forward of the pan and extending rearward over the axle and beyond the rear of the pan, a key secured to the rear of the pan and adapted to engage with notches on the lock-shaft, and trunnions secured on opposite sides of the pan forward of the hangers, and adapted to engage with the axle when the pan is being dumped, substantially as described.

4. In a wheeled scraper, the combination with a pan suspended from an axle having downwardly-offset ends on which wheels are secured, a bail secured to the forward end of said pan and extending forward into connection with a tongue, a lock-shaft mounted forward of the pan and extending over the axle and beyond the rear edge of the pan, a key secured to the rear of the pan and adapted to engage with the said lock-shaft, a triangular catch secured to the rear of the pan and adapted to engage with a projection on the under side of the lock-shaft whereby the pan may be locked in its fully-dumped position, substantially as described.

5. In a wheeled scraper, the combination with a pan suspended from an axle having downwardly-turned offset ends on which wheels are secured, a bail secured to the forward end of the said pan and extending forward into connection with a tongue a block mounted at the rear end of the tongue and between the members of the bail by which it is supported, a lock-shaft pivotally mounted on the said block and extending rearward over the axle and beyond the rear of the pan, a key secured to the rear of the pan and adapted to engage with notches on the said lock-shaft, and a spring mounted on the said block and engaging with the forward end of the said lock-shaft, whereby it is prevented from being thrown forward, substantially as described.

In testimony whereof I have signed this specification in the presence of two subscribing witnesses.

AMOS B. COREY.

Witnesses:
JOHN E. BAGLEY,
A. P. BOWMAN.